United States Patent
So et al.

[11] Patent Number: 6,022,149
[45] Date of Patent: Feb. 8, 2000

[54] FIBRE OPTIC ADAPTOR

[76] Inventors: Vincent So; Jonathan So, both of 529 Chapel Street, Ottawa, Ontario, Canada, K1N 8A1

[21] Appl. No.: 09/019,508

[22] Filed: Feb. 5, 1998

[51] Int. Cl.[7] .................................................. G02B 6/36
[52] U.S. Cl. ................................ 385/53; 385/60; 385/72
[58] Field of Search ............................. 385/53–60, 62, 385/70, 72, 73, 75–78, 81

[56] References Cited

U.S. PATENT DOCUMENTS

| | | | |
|---|---|---|---|
| 4,605,280 | 8/1986 | Welber et al. | 385/88 |
| 4,911,518 | 3/1990 | Miller | 350/96.2 |
| 4,936,662 | 6/1990 | Griffin | 350/96.2 |
| 5,253,315 | 10/1993 | Fentress | 385/78 |
| 5,333,221 | 7/1994 | Briggs et al. | 385/55 |

*Primary Examiner*—Rodney Bovernick
*Assistant Examiner*—Ellen E. Kang
*Attorney, Agent, or Firm*—Litman, Kraai, & Brown, L.L.C.; John C. McMahon

[57] ABSTRACT

A fiber optic adaptor is provided which facilitates the connection of either an ST terminated fiber or an FC terminated fiber to another FC terminated fiber, or to some other optical device. The adaptor has a pair of pins mounted on supports connected to an FC coupling receptacle. The pins have extended and retracted positions. When extended, the pins engage the J-shaped slots of the ST terminated fiber, and when retracted, they are out of the way allowing the FC terminated fiber to be connected to the receptacle. In another embodiment, an adaptor is provided which facilitates the connection of either an ST terminated fiber or an SC terminated fiber to another SC terminated fiber.

16 Claims, 9 Drawing Sheets

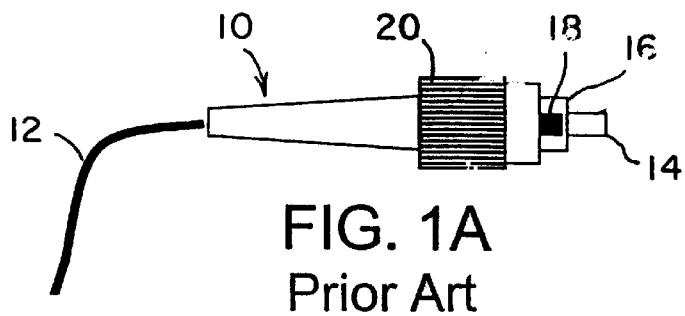
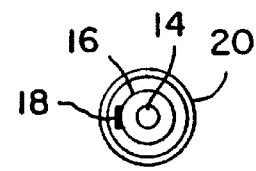
FIG. 1A
Prior Art
FIG. 1B
Prior Art
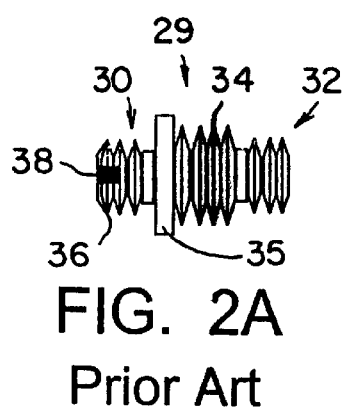
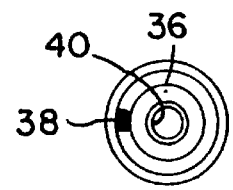
FIG. 2A
Prior Art
FIG. 2B
Prior Art
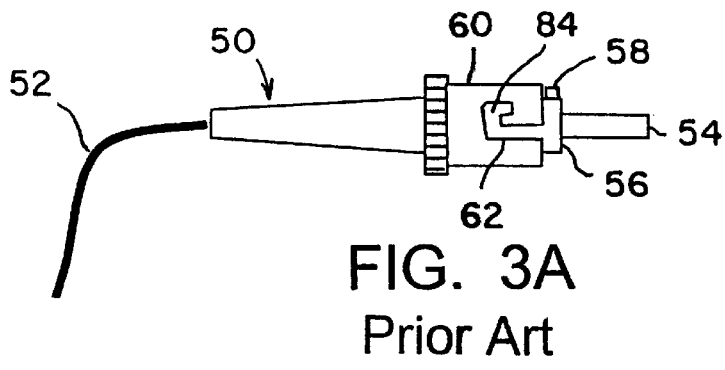
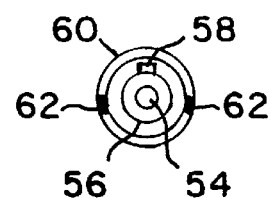
FIG. 3A
Prior Art
FIG. 3B
Prior Art
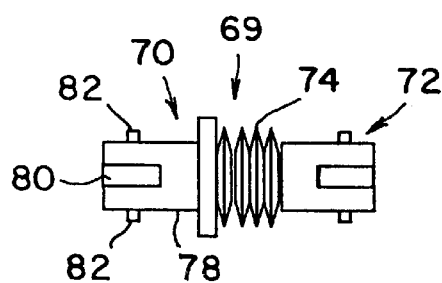
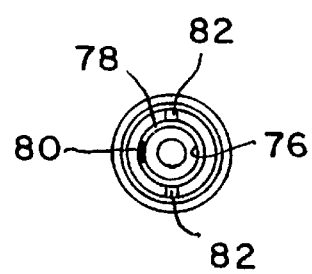
FIG. 4A
Prior Art
FIG. 4B
Prior Art

6,022,149

FIBRE OPTIC ADAPTOR

FIELD OF THE INVENTION

The invention relates to optical fibre connectors and more particularly to mechanisms which allow connections between fibres equipped with otherwise incompatible connector types.

BACKGROUND OF THE INVENTION

In order to connect one optical fibre to another, the fibres are equipped with connectors at their ends. There are many types of such connectors, the most commonly used in North American telecommunications applications being AT&T's (American Telephone and Telegraph) ST-type connector, and NTT's (Nippon Telegraph and Telephone) FC-type connector. Two fibres which are to be connected are equipped with the same type of connector (FC or ST), and these connectors are each connected to an intermediate coupling receptacle. Both these types of connectors rely on a ferrule to achieve precise fibre alignment, but they employ different and incompatible latching mechanisms. The ST-type connector relies on a ¼ turn bayonet (spring loaded twist and lock) coupling mechanism, and the FC-type connector relies on a threaded coupling mechanism. In order to interconnect two fibres which are terminated with different connector types, for example an FC terminated fibre and an ST terminated fibre, special adaptors are required. Using such special adaptors is not convenient and introduces extra loss in the connection.

In addition to the need to facilitate connections between two optical fibres, there is also the need to facilitate the connection between a fibre and an active device such as a detector, laser or LED (light emitting diode) mounted in a receptacle mount. Typically, active devices have receptacle mounts which are capable of receiving one of ST or FC-terminated fibres but not both. Thus, to connect an FC terminated fibre to an active device having an ST-type receptacle mount, again special adaptors are required.

The most commonly used fibre connectors in local area communications include the SC-type connector and the above identified ST-type connector. Again, these connectors use different and incompatible latching mechanisms with the ST-type connector relying on the above identified ¼ turn bayonet coupling mechanism, and the SC-type connector relying on a push-pull coupling mechanism.

SUMMARY OF THE INVENTION

It is an object of the invention to provide a mechanism for connecting a FC-terminated fibre to an ST-terminated fibre.

It is another object of the invention to provide a mechanism for connecting a SC-terminated fibre to an ST-terminated fibre.

According to a first broad aspect, the invention provides an adaptor for use in combination with an FC receptacle having a longitudinal axis, for connecting to the FC receptacle either an FC-type connector or an ST-type connector having J-shaped notches, the adaptor comprising: two pin supports and two pins, the pin supports being connectable to the FC receptacle for supporting the two pins in positions perpendicular to the longitudinal axis of the receptacle and on opposite sides of the longitudinal axis of the receptacle in a manner which does not interfere with the connection of an FC-type connector to the FC receptacle; the two pins being mounted retractably in said pin supports, the pins each having a retracted position and an extended position; wherein when the adaptor is installed on the FC receptacle, when the pins are in their retracted position the FC-type connector is connectable to the FC receptacle in conventional fashion, and when the pins are in their extended position the ST-type connector is connectable to the FC receptacle by aligning the J-shaped notches of the ST-type connector with the pins and by pushing the ST-type connector towards the receptacle and then twisting the ST-type connector such that the pins are held by the J-shaped notches, the pins engaging the J-shaped notches from outside the ST connector.

According to a second broad aspect, the invention provides an SC/ST receptacle comprising: an SC receptacle having a longitudinal axis, for connecting to the SC receptacle either an SC-type connector or an ST-type connector having J-shaped notches; two pin supports and two pins, the pin supports being connected to the SC receptacle for supporting the two pins in positions perpendicular to the longitudinal axis of the receptacle and on opposite sides of the longitudinal axis of the receptacle in a manner which does not interfere with the connection of an ST-type connector to the ST receptacle; the two pins being mounted retractably in said pin supports, the pins each having a retracted position and an extended position; wherein when the pins are in their retracted position the SC-type connector is connectable to the SC receptacle in conventional fashion, and when the pins are in their extended position the ST-type connector is connectable to the SC receptacle by aligning the J-shaped notches of the ST-type connector with the pins and by pushing the ST-type connector towards the receptacle and then twisting the ST-type connector such that the pins are held by the J-shaped notches, the pins engaging the J-shaped notches from outside the ST connector.

According to a third broad aspect, the invention provides an adaptor for use in combination with an FC/FC receptacle having a central threaded portion and a first and second FC receptacle and having a longitudinal axis, and alternatively in combination with a first FC connector and a second FC connector or in combination with a first FC connector and an ST connector, the adaptor comprising a base having an inside threaded circular opening which is threadable onto the central outside threaded portion of the FC/FC coupling receptacle, two pin supports and two pins, the pin supports being connected to the base and extending substantially perpendicular to the base parallel with and on opposite sides of said longitudinal axis, the two pins being mounted retractably in said pin supports, the pins each having a retracted position and an extended position, wherein when the adaptor is installed on the FC/FC receptacle, the first FC-type connector is connectable to the first FC receptacle in conventional fashion, when the pins are in their retracted position the second FC-type connector is connectable to the second FC receptacle in conventional fashion, and when the pins are in their extended position the ST-type connector is connectable to the FC receptacle by aligning the J-shaped notches of the ST-type connector with the pins and by pushing the ST-type connector towards the receptacle and then twisting the ST-type connector such that the pins are held by the J-shaped notches, the pins engaging the J-shaped notches from outside the ST-type connector.

BRIEF DESCRIPTION OF THE DRAWINGS

Preferred embodiments of the invention will now be described with reference to the attached drawings in which:

FIGS. 1A and 1B are a side view and an end view respectively of a conventional FC-terminated fibre;

FIGS. 2A and 2B are a side view and an end view respectively of a conventional coupling receptacle for FC-type connectors;

FIGS. 3A and 3B are a side view and an end view respectively of a conventional ST-terminated fibre;

FIGS. 4A and 4B are a side view and an end view respectively of a convention coupling receptacle for ST-type connectors;

DETAILED DESCRIPTION OF THE PREFERRED EMBODIMENTS

Figure 5A:
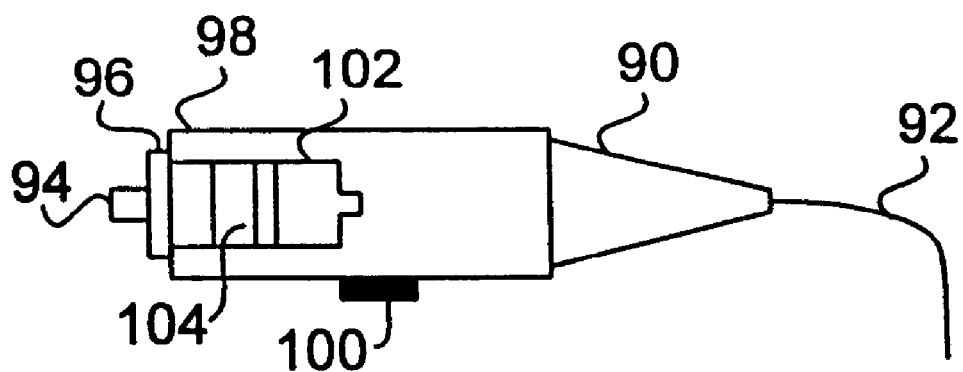
FIGS. 5A and 5B are a side view and an end view respectively of an SC-terminated fibre.

A conventional FC-type connection is made between two FC-terminated fibres each such as the one illustrated in FIGS. 1A and 1B through the use of an FC/FC coupling receptacle for FC-type connectors such as the one illustrated in FIGS. 2A and 2B. The FC-terminated fibre of FIGS. 1A and 1B has an FC-type connector generally indicated by 10 at the end of a fibre 12. The FC-type connector 10 has a ferrule 14, an inner cylinder 16 with a raised portion 18, and an outer cylinder 20 which has an inside thread. the outer cylinder 20 is rotatable with respect to the inner cylinder 16. The FC/FC coupling receptacle of FIGS. 2A and 2B is generally indicated by 29 and has at opposite ends a first receptacle 30 and a second receptacle 32 each capable of receiving a FC-type connector. Between the two receptacles is a central outside threaded portion 34 with an abutment 35. The receptacle can be retained in a wall by inserting it into a hole in the wall until the abutment 35 abuts against the wall and by screwing a nut into the outside threaded portion 34 on the other side of the wall. By way of example, the first receptacle 30 will be described. It has an outer cylinder 36 which has an outside thread and has a notch 38 corresponding in shape with the raised portion 18 of the connector 10 of FIGS. 1A and 1B, and an inner cylinder 40. When connected, the ferrule 14 of the connector 10 is inserted within the inner cylinder 40 of the coupling receptacle 30, the inner cylinder 16 of the connector 10 goes between the inner and outer cylinders 40,36 of the coupling receptacle 30, and the threaded outer cylinder 20 of the connector 10 is threaded onto the outer cylinder 36 of the coupling receptacle 30. Such connections are well known in the art and will not be described further.

A conventional ST-type connection is made between two ST-terminated fibres each such as the one illustrated in FIGS. 3A and 3B through the use of an ST/ST coupling receptacle for ST-type connectors such as the one illustrated in FIGS. 4A and 4B. The ST-terminated fibre of FIGS. 3A and 3B has an ST-type connector generally indicated by 50 at the end of a fibre 52. The ST-type connector has a ferrule 54, an inner cylinder 56 with a raised portion 58, and an outer cylinder 60 which is spring loaded with respect to the inner cylinder 56 in a direction away from the ferrule 54 and which has a pair of "J-shaped" notches 62 on opposite sides of the outer cylinder. the outer cylinder 60 is rotatable with respect to the inner cylinder 56. The coupling receptacle of FIGS. 4A and 4B is generally indicated by 69 and has a first receptacle 70 and a second receptacle 72 each capable of receiving an ST-type connector. Between the two receptacles is a central outside threaded portion 74 which can be threaded into any correspondingly inside threaded item. By way of example, the first receptacle 70 will be described. The coupling receptacle has an inner cylinder 76, and has an outer cylinder 78 which has a notch 80 corresponding in shape with the raised portion 58 of the connector of FIGS. 3A and 3B, and has a pair of small cylindrical protuberances 82 which extend from the outer cylinder 78 on opposite sides. To make a connection, the ferrule 54 of the connector 50 is inserted within the inner cylinder 76 of the coupling receptacle 70, the inner cylinder 58 of the connector 50 is inserted inside the outer cylinder 78 of the coupling receptacle 70 with the raised portion 58 being received by the notch 80. Then the two protuberances 82 are aligned with the J-shaped notches 62, and the spring loaded outer cylinder 60 is pressed towards the coupling receptacle 70 and rotated such that the protuberances 82 are captured in tip areas 84 of the J-shaped notches 62. Such connections are well known in the art and will not be described further.

Figure 5B:
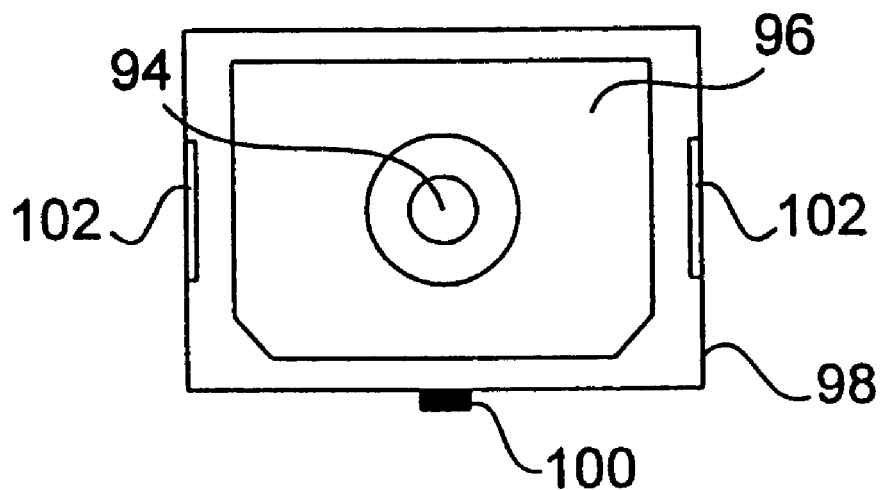
Figure 6A:
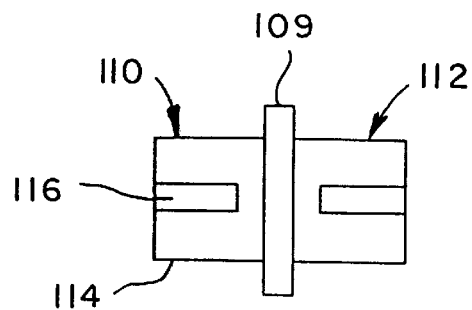
FIGS. 6A and 6B are a side view and an end view respectively of a coupling receptacle for SC-type connectors.
Figure 6B:
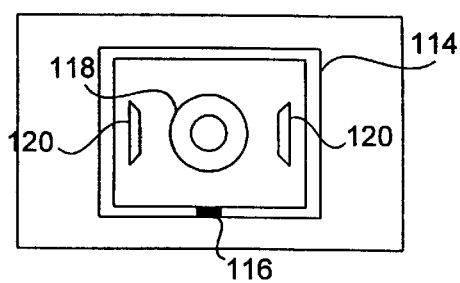
Figure 7:
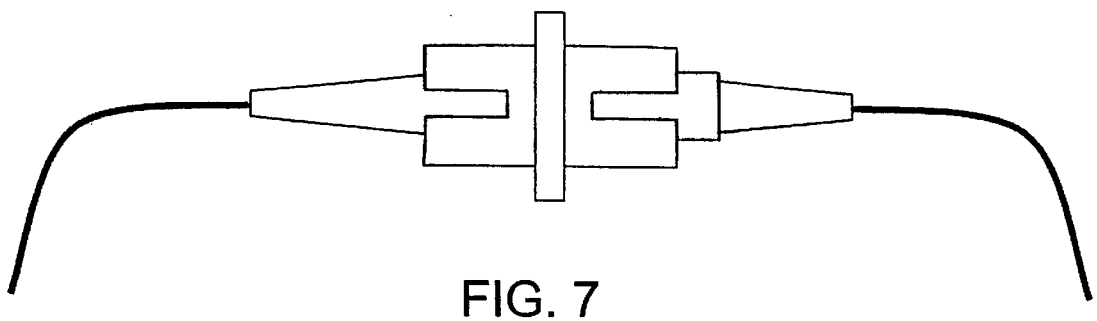
FIG. 7 is a side view of a connection between two SC-type connectors using the coupling receptacle of FIGS. 6A and 6B.

A conventional SC-type connection is made between two SC-terminated fibres each such as the one illustrated in FIGS. 5A and 5B through the use of a SC/SC coupling receptacle for SC-type connectors such as the one illustrated in FIGS. 6A and 6B. The SC-terminated fibre of FIG. 5 has an SC-type connector generally indicated by 90 at the end of a fibre 92. The SC-type connector has a ferrule 94, an inner piece 96 which is cylindrical on its inside, and which is roughly square on its outside, and an outer piece 98 which has a hollow inside shaped for receiving the inner piece 94. One side of the outer piece 98 has a raised portion 100. The two sides perpendicular to this one side have openings 102 which expose a catch 104 in the inner piece 96. The coupling receptacle of FIGS. 6A and 6B is generally indicated by 109 and has a first receptacle 110 and a second receptacle 112 each capable of receiving an SC-type connector. By way of example, the first receptacle 110 will be described. It has an outer rectangular portion 114 which has a notch 116 corresponding in shape with the raised portion 100 of the connector 90, an inner cylinder 118, and a pair of latching fingers 120. When connected, the ferrule 94 of the connector 90 is inserted within the inner cylinder 118 of the coupling receptacle 110, the outer piece 98 of the connector 90 goes inside the rectangular portion 114 of the receptacle 110 with the raised portion 100 being received by the notch 116, and the two latching fingers 120 are received by the catches 104 of the inner piece 96 of the connecter 90. FIG. 7 shows two SC-terminated fibres connected with the coupling receptacle of FIG. 6. Such connections are well known in the art and will not be described further.

Figure 8:
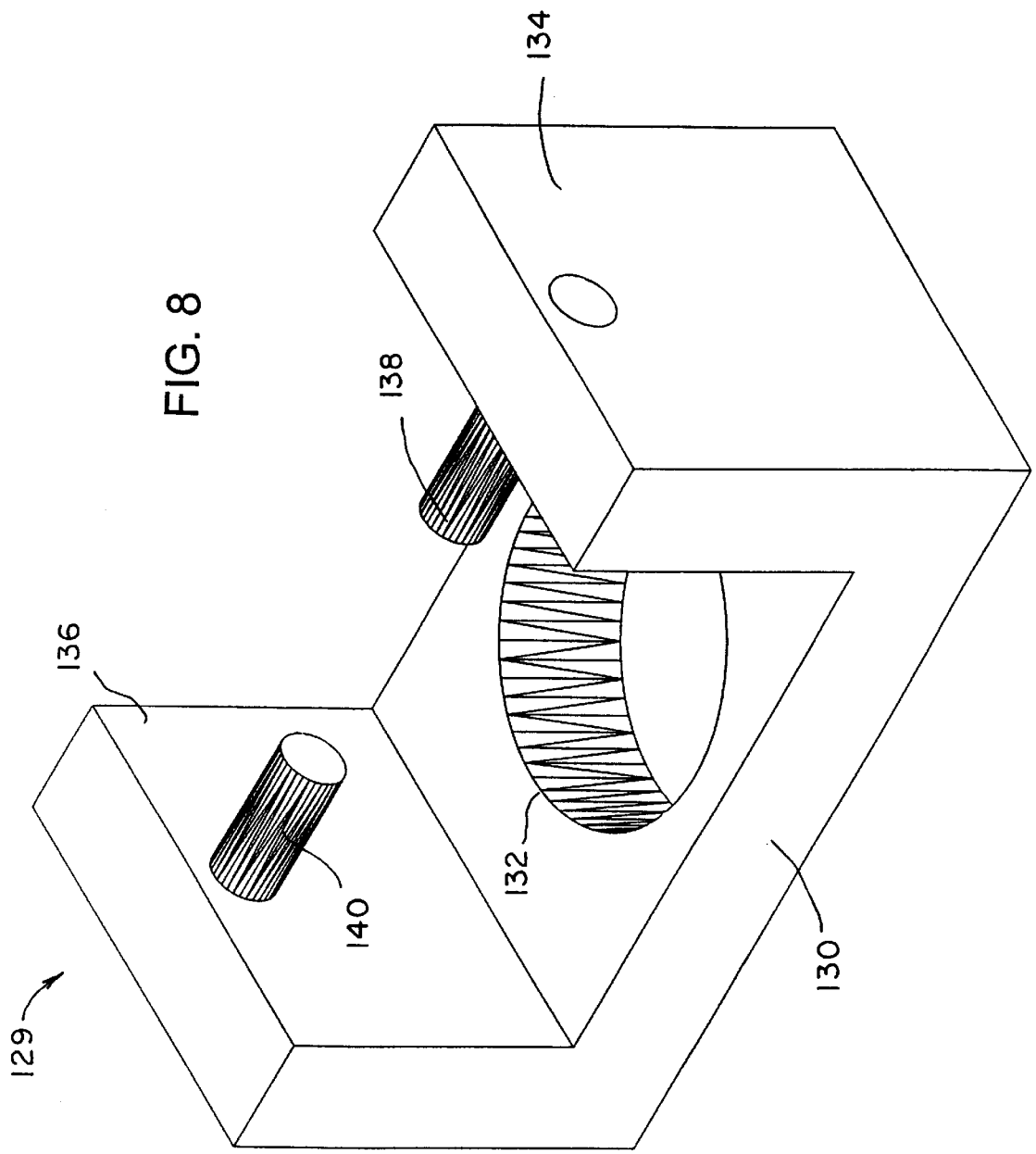
FIG. 8 is a perspective view of an adaptor for use in connecting an FC-type connector to an ST-type connector according to an embodiment of the invention.
Figure 9:
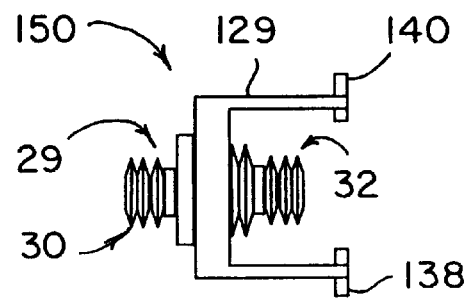
FIG. 9 is a side view of the coupling receptacle of FIG. 2 for FC-type connectors equipped with the adaptor of FIG. 8.

Referring now to FIG. 8 this shows a coupling adaptor according to an embodiment of the invention generally indicated by reference numeral 129 and having a base 130 with an inside threaded circular opening 132. The inside threaded circular opening 132 matches the central outside threaded portion 34 of the FC/FC style coupling receptacle of FIGS. 2A and 2B. Two pin supports in the form of arms 134,136 protrude at right angles from the base 130 and on opposite sides of the base. Each arm 134,136 has a respective retractable pin 138,140. These pins 138,140 are described in detail below. The adaptor 129 is shown installed onto an FC-style coupling receptacle in FIG. 9. This is achieved by threading the circular opening 132 onto the central outside threaded portion 34 of the FC-style coupling receptacle. This adapter plus receptacle combination will be referred to as an adapted coupling receptacle and is generally indicated by 150. The retractable pins 138,140 in FIG. 8 are in their extended position, while the same pins are shown in FIG. 9 in their retracted positions. The adapted coupling receptacle 150 of FIG. 9 is now capable of being used to connect a pair of FC style connectors, or an FC connector and an ST connector.

The adaptor 129 can be made of any switchable material, with brass, stainless steel and aluminum being preferred materials.

Figure 10:
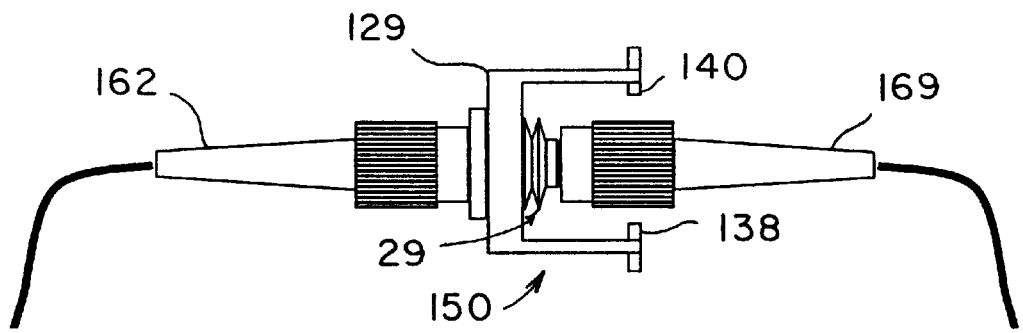
FIG. 10 is a side view of an FC-terminated fibre connected to an FC-terminated fibre using the apparatus of FIG. 9.
Figure 11:
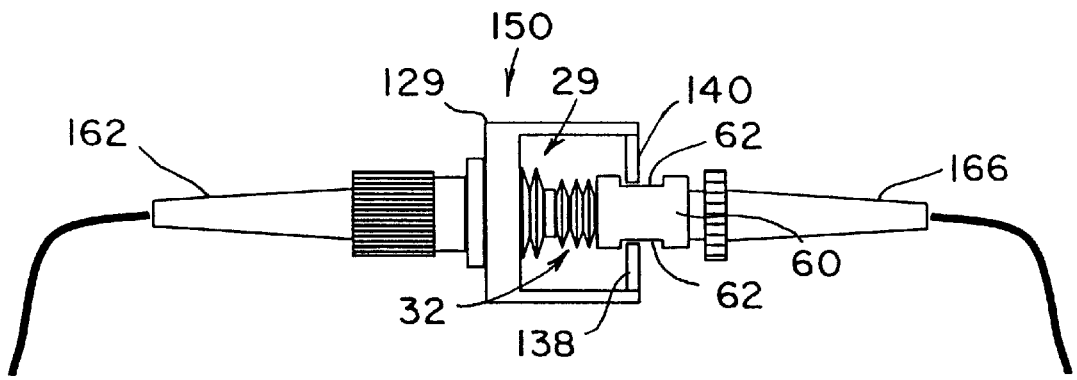
FIG. 11 is a side view of an FC-terminated fibre connected to an ST-terminated fibre using the apparatus of FIG. 9.

In FIG. 10, the adapted coupling receptacle 150 is used to connect two FC-type connectors 162,164. In this configuration, the pins 138,140 are moved to their retracted position, and the FC/FC coupling receptacle 29 functions in its normal mode with the coupling adaptor 129 not coming into play in the connection. In FIG. 11, the adapted coupling receptacle 150 is used to connect an FC-type connector 162 to an ST-type connector 166. In this configuration, the pins 138,140 are moved to their extended position. One of the two receptacles 30,32 of the FC/FC coupling receptacle 29 (receptacle 30, hidden from view) functions in its normal mode to couple to the FC-type connector 162. On the other side, the ferrule of the ST connector 166 is inserted inside the inner cylinder of the remaining FC receptacle 32. The inner cylinder of the receptacle 32 butts against the inner cylinder of the connector 166, and the spring loaded outer portion 60 is pressed towards the receptacle 29 so as to receive the two pins 138,140 in its J-shaped notches. The spring loaded outer portion 60 is then rotated to catch the pins 138,140 in the end portions of the J-shaped notches 62. In contrast to the engagement of the protuberances of the ST/ST coupling receptacle 69 with the ST connector J-shaped notches 62 which is done from within the outer cylinder 60 of the ST connector, the pins 138,140 of the adapted coupling receptacle 150 engage the J-shaped notches 62 from outside the outer cylinder of the ST connector 166.

The necessity for the pins 138,140 to engage the J-shaped notches 62 of the ST-type connectors imposes requirements upon the dimensions of the coupling receptacle. It is important that the pin supports 138,140 be connectable to the FC receptacle in a manner which supports the pins in positions perpendicular to the longitudinal axis of the receptacle and on opposite sides of the receptacle such that they do not interfere with the connection of an FC-type connector to the FC receptacle when they are in their retracted position. It is also important that the pins when extended are capable of engaging the J-shaped notches of an ST-type connector. An example set of dimensions which are known to result in the required engagement are shown in FIG. 8. In this example, the base 130 has a length of 20 mm, a width of 10 mm and a thickness of 3 mm. The total height is 10 mm, with the arms 134,136 each being 10 mm in width and 3 mm thick. The pins 138,140 when extended are separated from each other by 7 mm. The distance from the axial centre of pins 138,140 to the bottom of the base 130 is 8.75 mm. The entire adaptor is preferably made of metal.

Figure 12:
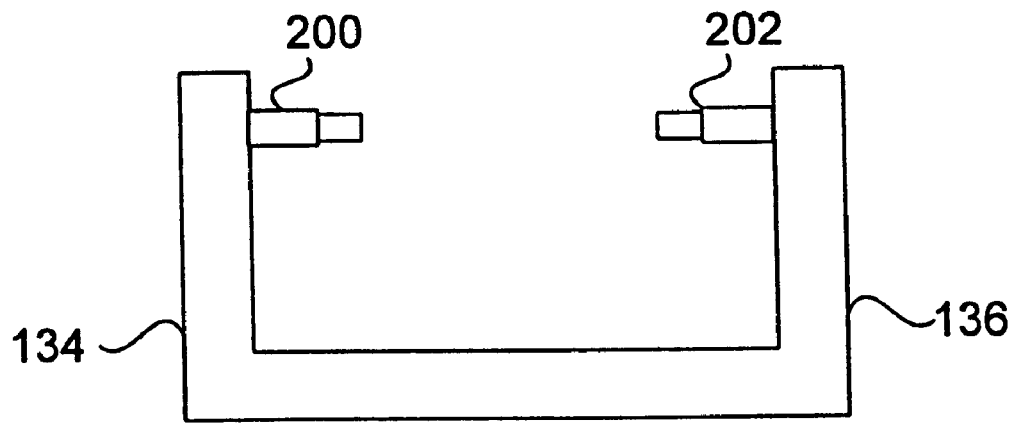
FIG. 12 is a side view of the adaptor of FIG. 8 equipped with spring loaded pins.
Figure 13:
FIG. 13 is a side view of the adaptor of FIG. 8 equipped with screws for pins.

There are many ways to implement the pins 138,140, and three examples are shown in FIGS. 12,13, and 14. In FIG. 12, the pins are implemented as a pair of spring pins 200,202 which are biased towards their extended positions but which may be compressed to their retracted positions. In FIG. 13, the pins are implemented with a pair of screws 204,206 which can be screwed into the arm portions 134,136 to their extended positions, or partially unscrewed from the arm portions to their retracted positions.

Figure 14C:
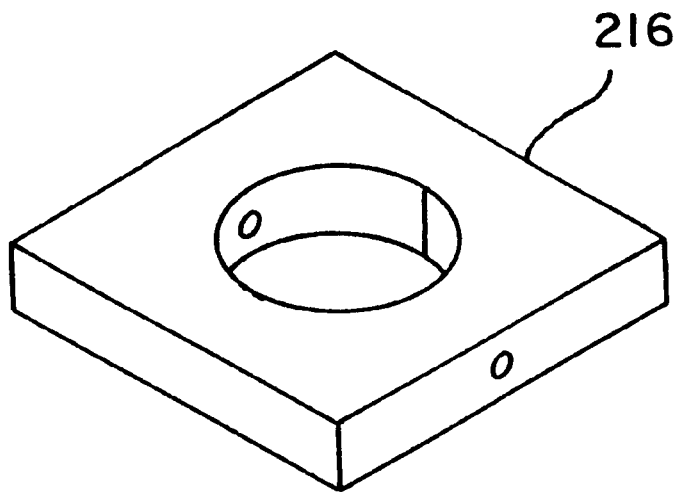
FIGS. 14A, 14B and 14C perspective views of a pin, arm portion and base respectively for an embodiment of the adaptor of FIG. 8.
Figures 14A, 14B:
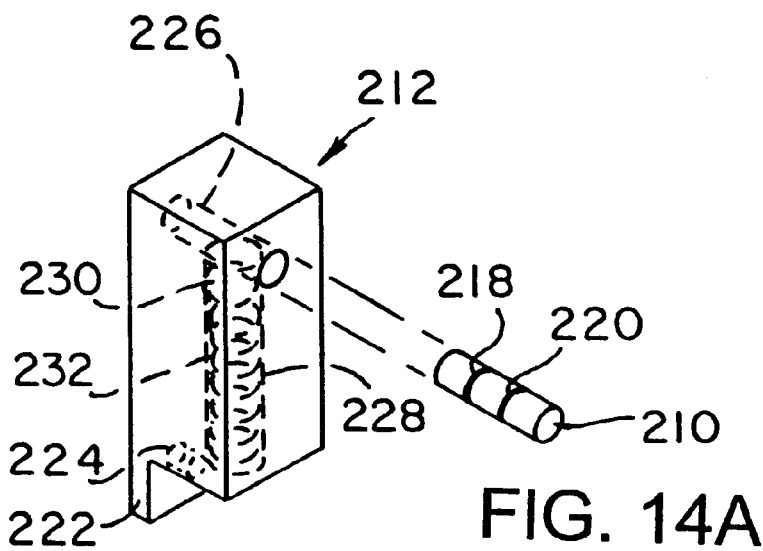

FIGS. 14A,14B and 14C show details of a pin 210, arm portion 212 and base 216 respectively for use in an embodiment in which the pin 210 is provided with first and second spaced ring notches 218,220 within which to receive a ball bearing which is spring loaded within the arm in which it is mounted.

The arm portion 212 is initially a separate piece from the base 216. In this example, the arm portion 212 is square in cross section, only being a fraction as wide as the base 216. The arm portion 212 has a bracket portion 222 extending from its bottom which has a hole 224 through it to receive a screw (not shown) which will attach the arm portion to the base portion 216. The arm portion 212 has a cylindrical hole 226 through it within which to receive the pin 210. The arm portion 212 also has a cylindrical hollow 228 within which to receive the ball bearing 230, and a spring 232 for biasing the ball bearing against the pin 210 when installed in hole 226. The base portion 216 is equipped with two threaded holes for receiving two screws, one each for attaching an arm portion 212. The pin 210 is slidable between an extended position in which state it is held in place by the ball bearing being engaged with the first notch 218, and a retracted position in which state it is held in place by the ball bearing being engaged with the second notch 220.

In the embodiment of FIG. 8, the adaptor is equipped with an inside threaded opening 132 to mate it with the central threaded portion 34 of the conventional FC/FC style coupling receptacle 29 without the need for any modifications to the FC/FC style coupling receptacle. Alternatively, the coupling receptacle 29 and adaptor 129 may be made in an integrated fashion in which case the adaptor portion is permanently attached to the coupling receptacle.

Figure 15:
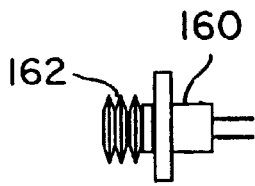
FIG. 15 is a side view of an active device mounted in a conventional FC-type receptacle mount.
Figure 16:
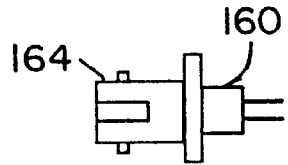
FIG. 16 a side view of an active device mounted in a conventional ST-type receptacle mount.
Figure 17:
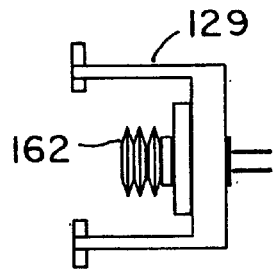
FIG. 17 is a side view of an active device mounted in an FC-type receptacle mount equipped with the adaptor of FIG. 8 according to an embodiment of the invention.
Figure 18:
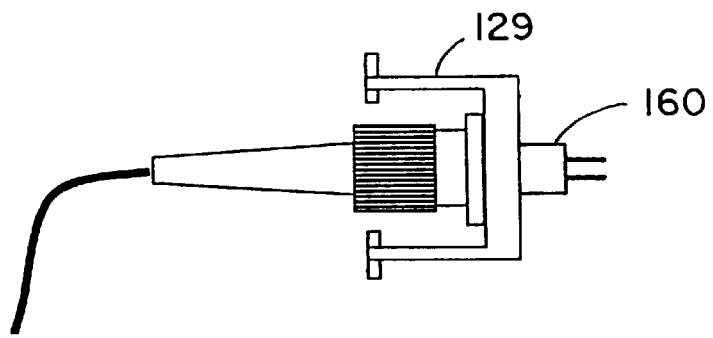
FIG. 18 is side view of an FC-terminated fibre connected to the apparatus of FIG. 17.
Figure 19:
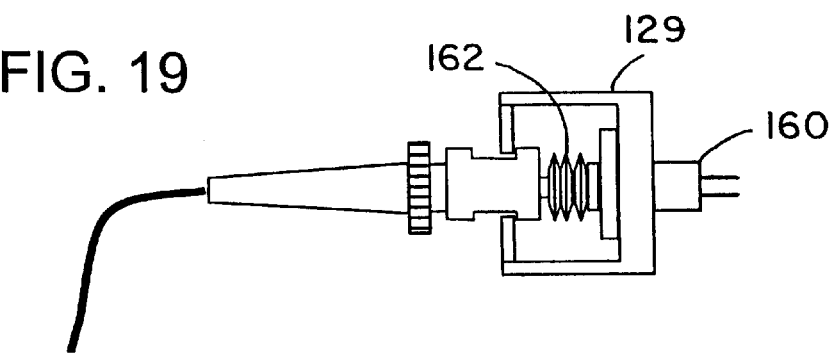
FIG. 19 is a side view of an ST-terminated fibre connected to the apparatus of FIG. 17.

Referring now to FIG. 15, an active device 160 may also be mounted to a single ended FC-type receptacle mount 162 for facilitating the connection of an FC-terminated fibre to the active device. Alternatively, as shown in FIG. 16, an active device 160 may be mounted to a single-ended ST-type receptacle mount 164 for facilitating the connection of an ST-terminated fibre to the active device. The adaptor 129 of FIG. 8 may also be used in this context by combining the adaptor with the FC-style receptacle of FIG. 15, such as shown in FIG. 17. In this case, the adaptor portion 129 is shown integrated with the FC-style receptacle 162 as a single unit which obviates the need for the inside threaded circular opening 132. This can be used to connect an FC-terminated fibre to the active device, such as shown in FIG. 18, and to connect an ST terminated fibre to the active device such as shown in FIG. 19. The use of the adaptor for this application is the same as described previously with respect to FIGS. 10 and 11.

Figure 20:
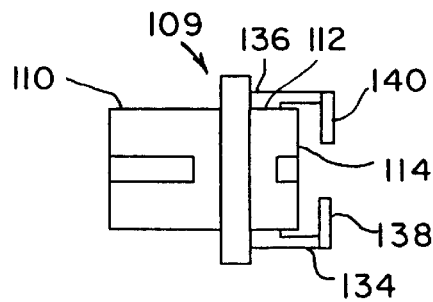
FIG. 20 is a side view of a coupling receptacle for ST and SC-type connectors according to an embodiment of the invention.
Figure 21:
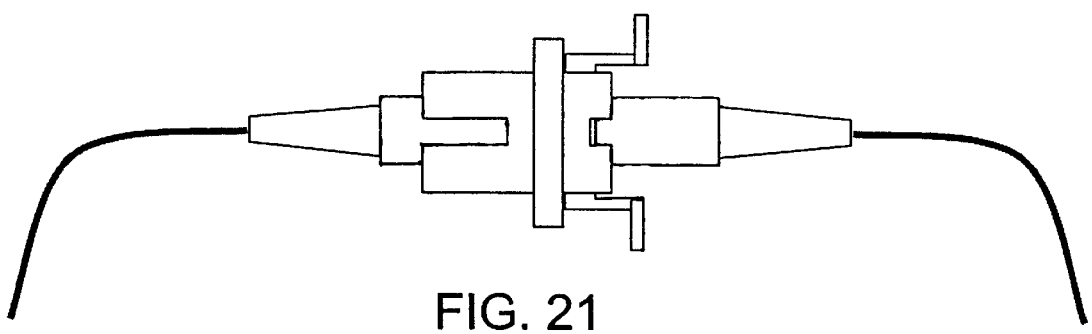
FIG. 21 is side view of two SC-terminated fibres connected using the ap ratus of FIG. 20.
Figure 22:
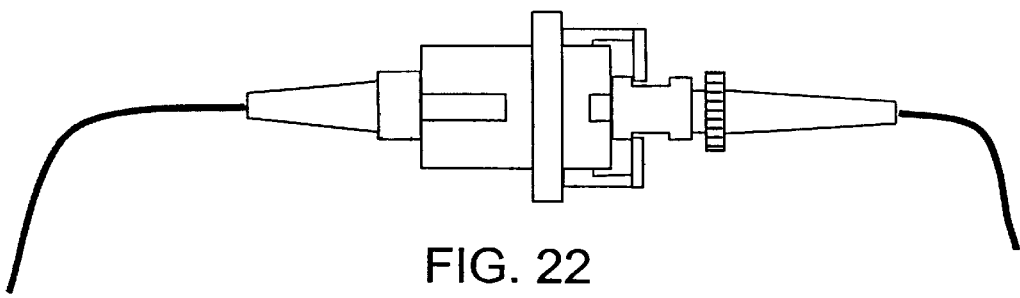
FIG. 22 is a side view of an SC-terminated fibre connected to an ST-terminated fibre using the apparatus of FIG. 20.

Referring now to FIG. 20, one of the two SC-type receptacles 110,112 of the SC/SC type coupling receptacle 109 has been adapted according to an embodiment of the invention to permit either an SC/SC connection or an SC/ST connection. In this case, the outer rectangular portion 114 of the adapted receptacle 112 has been shortened. Two pin supports 134,136 with retractable pins 138,140 are connected to the receptacle 112, and preferably are integrated with the outer rectangular portion 114. It is important that the pin supports 138,140 be connectable to the SC receptacle in a manner which supports the pins in positions perpendicular to the longitudinal axis of the receptacle and on opposite sides of the receptacle such that they do not interface with the connection of an SC-type connector to the SC receptacle when they are in their retracted position. It is also important that the pins when extended are capable of engaging the J-shaped notches of an ST-type connector. With the pins 138,140 retracted, a normal SC/SC connection may be made such as illustrated in FIG. 21. With the pins 138,140 extended, an SC/ST connection may be made such as illustrated in FIG. 22.

Numerous modifications and variations of the present invention are possible in light of the above teachings. It is therefore to be understood that within the scope of the appended claims, the invention may be practised otherwise than as specifically described herein.

The embodiments of the invention in which an exclusive property or privilege is claimed are defined as follows:

1. An adaptor for use in combination with an FC receptacle having a longitudinal axis, for connecting to the FC receptacle either an FC-type connector or an ST-type connector having J-shaped notches, the adaptor comprising:

two pin supports and two pins, the pin supports being connectable to the FC receptacle for supporting the two pins in positions perpendicular to the longitudinal axis of the receptacle and on opposite sides of the longitudinal axis of the receptacle in a manner which does not interfere with the connection of an FC-type connector to the FC receptacle;

the two pins being mounted retractably in said pin supports, the pins each having a retracted position and an extended position;

wherein when the adaptor is installed on the FC receptacle, when the pins are in their retracted position the FC-type connector is connectable to the FC receptacle and when the pins are in their extended position the ST-type connector is connectable to the FC receptacle by aligning the J-shaped notches of the ST-type connector with the pins and by pushing the ST-type connector towards the receptacle and then twisting the ST-type connector such that the pins are held by the J-shaped notches, the pins engaging the J-shaped notches from outside the ST connector.

2. An adaptor according to claim 1 wherein said FC coupling receptacle forms part of an FC/FC coupling receptacle having a central outside threaded portion and another FC coupling receptacle, the adaptor further comprising a base having an inside threaded circular opening which is threadable onto the cental outside threaded portion of the FC/FC coupling receptacle, the two pin supports being connected to the base;

whereby a connection between an FC connector and an ST connector can be made by connecting the ST connector to said FC coupling receptacle, and connecting the FC connector to said another FC coupling receptacle.

3. An adaptor according to claim 2 wherein said supports extend perpendicular to said base parallel and on opposit sides of said longitudinal axis.

4. An adaptor according to claim 1 in combination with the FC-type receptacle and an optical device connected to the FC-type receptacle.

5. An apparatus according to claim 4 wherein the adaptor and FC-type receptacle comptises a single integrated unit.

6. An adaptor according to claim 1 in combination with an FC/FC coupling receptacle having said FC receptacle and also having another FC receptacle, wherein the adaptor and FC/FC coupling receptacle comrise a single integrated unit, whereby either an FC-type connector or an ST-type connector connected to said FC receptacle may be connected to an FC type connector connected to said another FC receptacle.

7. An adaptor according to claim 1 wherein said pins are spring loaded pins which are biased towards their extended positions.

8. An adaptor according to claim 1 wherein said pins are screws, and said supports have threaded holes for receiving the screws, wherein the screws may be screwed further into the holes so as to be in the extended position, or less into the holes so as to be in the retracted position.

9. An adaptor according to claim 1 wherein said pins each have a respective spaced first ring notch and second ring notch, each support has a spring and bearing mechanism capable of engaging either of the ring notches of the respective pin, wherein in each support the engagement of the spring and bearing mechanism with the respective first ring notch holds the respective pin in the retracted position and the engagement of the spring and bearing mechanism with the respective second ring notch holds the respective pin in the extended position.

10. An SC/ST receptacle comprising:

an SC receptacle having a longitudinal axis, for connecting to the SC receptacle either an SC-type connector or an ST-type connector having J-shaped notches;

two pin supports and two pins, the pin supports being connected to the SC receptacle for supporting the two pins in positions perpendicular to the longitudinal axis of the receptacle and on opposite sides of the longitudinal axis of the receptacle in a manner which does not interfere with the connection of an ST-type connector to the ST receptacle;

the two pins being mounted retractably in said pin supports, the pins each having a retracted position and an extended position;

wherein when the pins are in their retracted position the SC-type connector is connectable to the SC receptacle, and when the pins are in their extended position the ST-type connector is connectable to the SC receptacle by aligning the J-shaped notches of the ST-type connector with the pins and by pushing the ST-type connector towards the receptacle and then twisting the ST-type connector such that the pins are held by the J-shaped notches, the pins engaging the J-shaped notches from outside the ST connector.

11. A receptacle according to claim 10 wherein said SC coupling receptacle forms part of an SC/SC coupling receptacle having another SC receptacle;

whereby a connection between an SC connector and an ST connector can be made by connecting the ST connector to said SC coupling receptacle, and connecting the SC connector to said another SC coupling receptacle.

12. A receptacle according to claim 10 wherein said supports extend perpendicular to said base parallel and on opposite sides of said longitudinal axis.

13. A receptacle according to claim 10 wherein said pins are spring loaded pins which are biased towards their extended positions.

14. A receptacle according to claim 10 wherein said pins are screws, and said supports have threaded holes for receiving the screws, wherein the screws may be screwed further into the holes so as to be in the extended position, or less into the holes so as to be in the retracted position.

15. A receptacle according to claim 10 wherein said pins each have a respective spaced first ring notch and second ring notch, each support has a spring and bearing mechanism capable of engaging either of the ring notches of the respective pin, wherein in each support the engagement of the spring and bearing mechanism with the respective first ring notch holds the respective pin in the retracted position and the engagement of the spring and bearing mechanism with the respective second ring notch holds the respective pin in the extended position.

16. An adaptor for use in combination with an FC/FC receptacle having a central threaded portion and a first and second FC receptacle and having a longitudinal axis, and alternatively in combination with a first FC connector and a second FC connector or in combination with a first FC connector and an ST connector, the adaptor comprising a base having an inside threaded circular opening which is threadable onto the central outside threaded portion of the FC/FC coupling receptacle, two pin supports and two pins, the pin supports being connected to the base and extending substantially perpendicular to the base parallel with and on opposite sides of said longitudinal axis, the two pins being mounted retractably in said pin supports, the pins each having a retracted position and an extended position, wherein when the adaptor is installed on the FC/FC receptacle, the first FC-type connector is connectable to the first FC receptacle in conventional fashion, when the pins are in their retracted position the second FC-type connector is connectable to the second FC receptacle, and when the pins are in their extended position the ST-type connector is connectable to the FC receptacle by aligning the J-shaped notches of the ST-type connector with the pins and by pushing the ST-type connector towards the receptacle and then twisting the ST-type connector such that the pins are held by the J-shaped notches, the pins engaging the J-shaped notches from outside the ST-type connector.

\* \* \* \* \*